United States Patent [19]

Sano

[11] Patent Number: 4,480,057

[45] Date of Patent: Oct. 30, 1984

[54] IMPACT-RESISTANT POLY(PHENYLENE OXIDE) COMPOSITIONS COMPRISING ENCAPSULATED FILLER MATERIAL

[75] Inventor: Hironari Sano, Yokkaichi, Japan

[73] Assignee: Mitsubishi Petrochemical Co., Ltd., Mie, Japan

[21] Appl. No.: 455,641

[22] Filed: Dec. 14, 1982

[30] Foreign Application Priority Data

Dec. 15, 1981 [JP] Japan ................... 56-202065

[51] Int. Cl.$^3$ .................. C08G 71/04; C08K 9/10; C08L 25/10; C08L 71/04
[52] U.S. Cl. .................... 523/206; 524/508; 525/92; 525/96; 525/98
[58] Field of Search .............. 524/508; 523/206; 525/92, 96, 98

[56] References Cited

U.S. PATENT DOCUMENTS

| | | | |
|---|---|---|---|
| 3,887,646 | 6/1975 | Yonemitsu et al. | 525/68 |
| 3,887,647 | 6/1975 | Yonemitsu et al. | 525/68 |
| 3,952,072 | 4/1976 | Yonemitsu et al. | 525/146 |
| 4,172,826 | 10/1979 | Haaf et al. | 525/99 |
| 4,172,929 | 10/1979 | Cooper et al. | 525/96 |
| 4,196,116 | 4/1980 | Haaf et al. | 525/99 |
| 4,239,673 | 12/1980 | Lee | 525/88 |
| 4,357,433 | 11/1982 | Braksmayer | 524/504 |
| 4,373,055 | 2/1983 | Haaf et al. | 525/92 |
| 4,376,186 | 3/1983 | Cooper | 525/92 |
| 4,383,082 | 5/1983 | Lee | 525/92 |

*Primary Examiner*—Herbert J. Lilling
*Attorney, Agent, or Firm*—Oblon, Fisher, Spivak, McClelland & Maier

[57] ABSTRACT

A poly(phenylene oxide) (PPO) composition which comprises a matrix of PPO or a blend of PPO and a styrene-based polymer and a dispersed phase whose principal component is a crystalline olefin polymer surrounded by a crystalline hydrogenated styrene-conjugated diene copolymer or hydrogenated styrene-conjugated diene copolymer, said dispersed phase being filled with an inorganic filler. This composition is superior in rigidity and impact resistance.

12 Claims, 3 Drawing Figures

IMPACT-RESISTANT POLY(PHENYLENE OXIDE) COMPOSITIONS COMPRISING ENCAPSULATED FILLER MATERIAL

BACKGROUND OF THE INVENTION

1. Field of the Invention

This invention relates to poly(phenylene oxide) (hereinafter abbreviated as PPO) resin compositions and more particularly to such compositions having improved impact resistance and improved resistance to heat distortion.

2. Description of the Prior Art

PPO is a very useful thermoplastic resin which has a high heat distortion temperature and superior mechanical and electrical properties. It is used in various applications as an engineering plastics material. PPO, however, has the disadvantage of poor processability and impact resistance because of its high glass transition temperature. In order to overcome this disadvantage, several attempts have been made to improve its processability and impact resistance.

U.S. Pat. No. 3,383,435 discloses a method for improving the processability of PPO by blending a styrene polymer such as polystyrene, rubber-modified polystyrene, or a styrene-acylonitrile-butadiene terpolymer.

In Japanese Patent Publication No. 1482/1968 a method is also proposed for improving the impact resistance of PPO by blending PPO with a rubbery polymer. In practice, the above two methods are combined, that is, PPO is blended with both a styrene polymer and a rubbery polymer.

An improvement in the composition incorporating two added components is proposed in U.S. Pat. No. 4,128,602. According to this improvement, the impact strength is further increased by keeping the particle diameter of the rubbery polymer, dispersed in a matrix of PPO or a mixture of PPO and a styrene polymer, to less than 2 microns. This method, however, involves several restrictions in practice because it requires very vigorous mixing to reduce the rubbery polymer particle diameter to less than 2 microns. Alternatively, it is possible to select a specially prepared rubber-modified polystyrene in which the particle diameter of the rubbery polymer is less than 2 microns.

The requirements for PPO in the industry are increasingly stringent, and, accordingly, there is a strong demand for PPO having greatly improved flow properties (processability) and impact resistance so that it can be used for thin-walled, complex molded articles.

Hence, there is great need for a PPO composition with improved processability and impact resistance.

SUMMARY OF THE INVENTION

Accordingly, it is an object of the invention to provide a poly(phenylene oxide) composition having an improved impact resistance.

A further object is to provide a PPO composition having an improved processability.

A further object is to provide a PPO composition having an inorganic filler in a special environment.

A further object is to provide a PPO composition having a good resistance to heat distortion.

Other objects of the invention will be apparent from the description of the invention which follows.

The objects of the invention are attained by a poly(phenylene oxide) composition comprising a matrix (continuous phase) of poly(phenylene oxide) or a blend of poly(phenylene oxide) and a styrene-based polymer and dispersed in said matrix a dispersed phase of a crystalline polymer filled with an inorganic filler, said dispersed phase polymer completely surrounding each filler particle or aggregate thereof.

More particularly, the composition of this invention is an impact-resistant poly(phenylene oxide) composition comprising:

(a) a matrix comprising poly(phenylene oxide) or a mixture of poly(phenylene oxide) and a styrene-based polymer, and (b) dispersed in said matrix, a dispersed phase comprising a synthetic resin and a particulate inorganic filler, said synthetic resin dispersed phase substantially completely surrounding each particle of said filler and being selected from the group consisting of (i) a crystalline olefin polymer phase comprising a functional derivative of a crystalline olefin polymer containing functional groups having an affinity for said inorganic filler or a blend of said functional derivative of a crystalline olefin polymer with an underivatized crystalline olefin polymer, and, interposed between said crystalline olefin polymer phase and said matrix, a crystalline or elastomeric hydrogenated styrene-conjugated diene polymer, and (ii) a crystalline hydrogenated styreneconjugated diene polymer phase comprising a functional derivative of a hydrogenated styrene-conjugated diene polymer containing functional groups having an affinity for both said inorganic filler and a blend of said functional derivative of a hydrogenated styrene-conjugated diene polymer with an underivatized crystalline hydrogenated styrene-conjugated diene polymer.

BRIEF DESCRIPTION OF THE DRAWINGS

A more complete appreciation of the invention and many of the attendant advantages thereof will be readily attained as the same becomes better understood with the following detailed description considered in connection with the accompanying drawings.

The accompanying drawings are electron micrographs at 6000× magnification of the samples pretreated as described in this specification. They were taken using a scanning electron microscope (Model HHS-2R, made by Hitachi, Ltd.).

DETAILED DESCRIPTION OF THE INVENTION AND PREFERRED EMBODIMENTS

Figure 1:
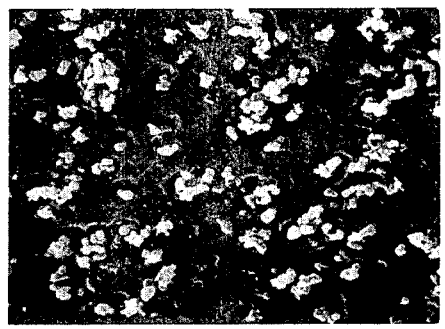
FIG. 1 is a micrograph of the composition prepared in Example 1. It is to be noted that calcium carbonate is present in the maleic anhydride-modified polypropylene which constitutes, together with the hydrogenated styrene-butadiene-styrene copolymer, the substantially crystalline dispersed phase.

In order to produce a significant improvement in the impact resistance of PPO or a blend of PPO and a styrene polymer, the present inventors investigated the mechanism of impact fracture of a PPO composition using a novel electron microscopy technique developed by them. The following invention is the result of this investigation.

An investigation of the impact behavior of a composition composed of PPO and rubber-modified polystyrene by electron microscopy revealed that styrene-rubber graft copolymer particles are dispersed in the matrix which is a uniformly mixed blend of PPO and polystyrene, and that when the composition is subjected to impact, crazing occurs in the matrix at the interface between the matrix and the rubber particles. The microcracks of the crazing increase gradually in number and length as the strain on the composition increases. Finally, the crazing grows into cracks, leading to the fracture of the material. Most of the impact energy is absorbed by the formation and growth of the crazing and therefore the composition has comparatively good impact resistance. (Crazing is defined as a void area containing 40 to 50 vol % of microfibrils which are highly locally oriented in the direction of stress in the gap opened at a right angle to the direction of stress (elongation) due to plastic deformation. Crazing takes place as the result of local orientation which is caused by plastic flow when a polymer material is subjected to impact. This local orientation requires a great deal of energy, and consequently the impact energy is absorbed). Thus, the role of the rubber particles is to disperse throughout the composition stress concentration points at which crazing is initiated. Consequently the number of crazing initiaton sites is increased thereby increasing the material's ability to absorb energy Our electron microscopic investigation of the mechanism of impact fracture of a composition prepared by filling a mixture of PPO and rubber-modified polystyrene with an inorganic filler (several kinds of calcium carbonate having an average particle diameter of 0.03 to 7 microns) also revealed that the inorganic filler particles are dispersed in the matrix consisting of a uniformly mixed composition of PPO and rubber-modified polystyrene, and that when the composition is subjected to impact, minute cracks occur around the inorganic filler particles. These cracks grow rapidly leading to material fracture. In addition, it was found that this composition is inadequately impact resistant because the previously mentioned efficient energy absorption by crazing does not take place in this composition.

Finally, our electron microscopic investigation of the mechanism of impact fracture of a composition prepared by blending a mixture of PPO and polystyrene with a rubbery polymer (styrene-butadiene rubber) and an inorganic filler revealed that the rubber particles and the inorganic filler particles are dispersed independently from each other in the matrix, which itself is a uniform blend of PPO and polystyrene. When this composition is subjected to impact, cracks occur at the interface between the inorganic filler particles and the matrix, while almost no crazing occurs at the interface between the inorganic filler particles and the matrix or at the interface between the rubber particles and the matrix.

The elucidation of the mechanism of impact fracture for the three above-mentioned compositions led to the idea that it might be possible to prepare a high-impact resin material if PPO or a blend of PPO and styrene polymer is blended with a dispersed phase having a greater plastic deformability than the matrix phase and with the further condition that the dispersion phase contain an inorganic filler having a particle diameter smaller than that of the dispersed phase particles. In such a composition, subjecting the composition to impact creates many minute energy absorbing cracks at the interface of the inorganic filler in the dispersed phase. The growth of these cracks is suppressed by the deformability of the surrounding dispersed phase component and consequently the cracks do not rapidly propagate to the matrix component. More, importantly crazing takes place very easily at the interface between the dispersed phase and the matrix due to the occurrence of cracks in the dispersed phase and the change of stress balance caused by the concomitant plastic deformation of the dispersed phase. Crazing and cracks growth absorbs the impact energy to a great extent. On this basis the present inventors carried out a series of experiments and developed a composition in which the dispersed phase is composed substantially of rubber. (See Japanese Patent Application No. 5524/1982).

The present inventors have now improved the proposed composition towards high-temperature rigidity as well as high impact resistance. A composition has thus, been obtained having a superior impact resistance and high-temperature rigidity and a dispersed phase composed substantially of a crystalline component. This technology is different from the conventional methods for improving the impact resistance of a glassy polymer.

Essentially this invention resides in an impact-resistant poly(phenylene oxide) composition which comprises a matrix (continuous phase) and a dispersed phase dispersed in said matrix, said matrix being poly(phenylene oxide) or a mixture of poly(phenylene oxide) and a styrene-based polymer, said dispersed phase being (i) a crystalline olefin polymer containing a functional derivative of crystalline olefin polymer surrounded by a crystalline or rubbery hydrogenated styrene-conjugated diene copolymer or (ii) a crystalline hydrogenated styrene-conjugated diene copolymer containing a functional derivative of a hydrogenated styrene-conjugated diene copolymer, said dispersed phase being filled with an inorganic filler.

The PPO composition of this invention is improved both in impact resistance and in rigidity, particularly high-temperature rigidity, by incorporating a crystalline resin and an inorganic filler. The composition of this invention is expected to find use for industrial parts such as electron appliance housings and automobile instrument panels which require greater impact resistance than hitherto because of the recent trend toward large size and thin walls.

The electron microscopic method developed originally for studying the morphology of the dispersed phase in the polymeric composition and the relationship between the morphology and the impact fracture is illustrated below.

A piece of cooled material is cut carefully with a glass knife or diamond knife mounted on a microtome at a low temperature, e.g. −70° to −100° C., so that an extremely flat surface is formed. The cut surface undergoes etching by a suitable method using ions, solvent, or acid, depending on the type of polymer and filler used.

Etching is required to visualize the internal morphology. Ion etching is preferable for confirming the presence of the matrix phase and the dispersed phase in the matrix phase. Such ion etching is accomplished by irradiating the test piece for 5 to 20 minutes with ions generated by gaseous electric discharge at 2000 to 15,000 volts under reduced pressure. For visualizing the inorganic filler, the ion etching is followed by acid etching at room temperature with hydrofluoric acid or hydrochloric acid.

The etching forms an irregular surface that corresponds to the internal morphology. Thus, it is possible to confirm the morphology of the composition by depositing gold on the surface and observing the surface under a scanning electron microscope.

Composition of the invention

The PPO used as the matrix of the composition of this invention has a structure represented by the following formula.

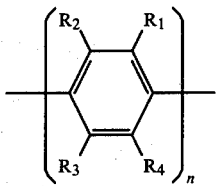

where $R_1$, $R_2$, $R_3$, and $R_4$ are hydrogen, halogen, a hydrocarbon or substituted hydrocarbon group, cyano, alkoxy, phenoxy, nitro, amino, or sulfo; and n is an integer of 20 to 800 indicating the degree of polymerization. Examples of $R_1$, $R_2$, $R_3$, and $R_4$ include hydrogen, chlorine, bromine, and iodine, and such groups as methyl, ethyl, propyl, butyl, allyl, phenyl, benzyl, methylbenzyl, chloromethyl, bromomethyl, cyanoethyl, cyano, methoxy, ethoxy, phenoxy, nitro, amino, and sulfo.

Examples of PPO include poly(2,6-dimethyl-1,4-phenylene oxide), poly(2,6-diethyl-1,4-phenylene oxide), poly(2,6-dipropyl-1,4-phenylene oxide), poly(2-methyl-6-isopropyl-1,4-phenylene oxide), poly(2,6-dimethoxy-1,4-phenylene oxide), poly(2,6-dichloromethyl-1,4-phenylene oxide), poly(2,6-diphenyl-1,4-phenylene oxide), poly(2,6-dicyano-1,4-phenylene oxide), poly(2,6-dichloro-1,4-phenylene oxide), and poly(2,5-dimethyl-1,4-phenylene oxide). They may be used in combination.

The styrene-based polymer which is used in combination with PPO as the matrix of the composition of this invention is a polymer having at least 25 mol % of the polymer units derived from a compound having the structure represented by the following formula:

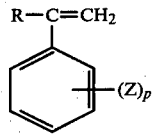

where Z is hydrogen, a lower alkyl group, chlorine, or vinyl; and p is an integer from 1 to 5.

Examples of such polymers include such homopolymers as polystyrene, polychlorostyrene, and poly(α-methylstyrene); modified polystyrenes such as rubber-modified polystyrene; and copolymers such as styrene-acrylonitrile copolymer (SAN), acrylonitrile-butadiene-styrene copolymer (ABS), copolymer of ethylvinylbenzene and divinylbenzene, and styrene-maleic anhydride copolymer. These may be used in combination with each other.

The polymer component which constitutes the dispersed phase of the composition of this invention is a crystalline olefin polymer which contains a functional derivative of a crystalline olefin polymer and is surrounded by a hydrogenated styrene-conjugated diene copolymer, or a substantially crystalline hydrogenated styrene-conjugated diene copolymer containing a functional derivative of a styrene-conjugated diene copolymer.

The crystalline olefin polymer used herein denotes homopolymers or copolymers of olefins such as ethylene, propylene, and butene-1, or copolymers of olefins and copolymerizable monomers such as vinyl acetate, (meth)acrylic acid esters, and methylhexadiene. Its crystallinity is greater than 30 wt%, preferably 40 wt%, as measured by the differential scanning calorimetry (DSC) method.

Examples of crystalline olefin polymers include low-, medium-, and high-density polyethylene, polypropylene, polybutene, poly-4-methylpentene, ethylene-propylene block or random copolymers, ethylene-vinyl acetate copolymers, ethylene-methylhexadiene copolymers, propylene-methylhexadiene copolymers, ethylene-propylene-butene copolymers, ethylene-propylene-hexene copolymers, and ethylene-propylene-methylhexadiene copolymers.

When a crystalline olefin polymer is used, it is surrounded by an elastomeric or crystalline hydrogenated styrene-conjugated diene copolymer which is interposed between the crystalline olefin polymer and the matrix.

The hydrogenated styrene-conjugated diene copolymer denotes a block copolymer of styrene and a diene compound such as butadiene or isoprene having a conjugated double bond such as butadiene or isoprene, said block copolymer being hydrogenated so that the number of unsaturated bonds in the polymer is reduced to less than 30%, preferably less than 20%, of the initial value. The styrene content is 10 to 80 wt%, preferably 20 to 50 wt%.

Hydrogenated styrene-conjugated diene copolymers may be elastomeric or crystalline, depending on the bonding state of the diene compound. A crystalline polymer of this type may be used alone as the resin that constitutes the dispersed phase of the composition of this invention. An elastomeric polymer of this type may be used in combination with the crystalline polymer or may be used for surrounding the crystalline olefin polymer.

The crystalline hydrogenated styrene-conjugated diene copolymer used for the composition of this invention has crystallinity greater than 5 wt%, preferably 10 wt%.

Examples of hydrogenated styrene-conjugated diene copolymers include partly or entirely hydrogenated styrene-butadiene-styrene block copolymers, styrene-isoprene-styrene block copolymers, and styrene-butadiene copolymer rubbers. They may be used in combination.

The functional derivative of a crystalline olefin polymer and the functional derivative of a hydrogenated styrene-conjugated diene copolymer act as carrier components that introduce an inorganic filler into the polymer component which constitutes the dispersed phase. Such a polymer has affinity for both the inorganic filler and the polymer component which constitutes the dispersed phase.

According to this invention, the polymer constituting the dispersed phase may be a functional derivative as long as it has the above-mentioned crystallinity. Therefore, the functional derivative along, which is the carrier component, may constitute part or all of the polymer components constituting the dispersed phase. However, such functional derivatives are expensive and the functionality and crystallinity are not easily compatible. Thus, it is advantageous to use it in small quantities as the carrier only.

The functional derivative of a crystalline olefin polymer or hydrogenated styrene-conjugated diene copolymer is a derivative of the above-mentioned crystalline olefin polymer or hydrogenated styrene-conjugated diene copolymer into which a group having affinity for an inorganic filler is introduced. Usually carboxylic acid groups, anhydrides thereof, or silane compounds are introduced.

The functional derivative of a crystalline olefin polymer includes crystalline olefin polymers into which a carboxylic acid or anhydride thereof is introduced by graft, block, or random copolymerization or substitution or oxidation. Examples are crystalline olefin polymers such as low-, medium-, and high-density polyethylene, polypropylene, and ethylene-propylene block or random copolymers having an unsaturated organic acid or anhydride thereof (e.g. acrylic acid, methacrylic acid, maleic acid, and itaconic acid and anhydrides thereof) introduced thereinto.

In addition, the crystalline olefin polymer may be modified by grafting an unsaturated silane compound such as vinyl trimethoxysilane, vinyltriethoxysilane, vinyl triacetoxysilane, γ-methacryloxypropyltrimethoxysilane, or propenyltrimethoxysilane represented by the following formula:

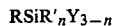

$$RSiR'_nY_{3-n} \quad (1)$$

where R is an ethylenic unsaturated hydrocarbyl or hydrocarbyloxy group; R' is an aliphatic saturated hydrocarbyl group; Y is a hydrolyzable organic group; and n is 0, 1, or 2, and the Y's may not be the same where there are more than one Y.

The content of carboxylic acid or anhydride thereof in the functional derivative is 0.25 to 25 wt%, preferably 0.4 to 20 wt%, in terms of —COOH, and the content of unsaturated organosilane compound is 0.05 to 5 wt%, preferably 0.1 to 4 wt%, in terms of Si.

Also preferable is an ionomer in which the carboxyl groups on the graft chain of the polymer modified with an unsaturated organic acid or anhydride thereof are partly connected through metal ions.

The functional derivative of the hydrogenated styrene-conjugated diene copolymer denotes the above-mentioned hydrogenated styrene-conjugated diene copolymer into which a hydrophilic group, particularly the above-mentioned unsaturated organic acid or anhydride thereof or unsaturated organosilane compound, is introduced. Prefered examples include styrene-butadiene-styrene block copolymers, styrene-isoprene-styrene block copolymers, and styrene-butadiene copolymer rubbers graft-modified with an unsaturated organic acid or anhydride thereof or an unsaturated organosilane compound, in which the unsaturated bond is partly or entirely hydrogenated. Particularly prefered is a graft-modified styrene-conjugated diene copolymer. These polymers may be used in combination.

In the composition of this invention, the dispersed phase, which is substantially crystalline, should preferably be uniformly dispersed in the form of fine particles in the matrix phase. Such a uniform dispersion can be prepared by mechanically blending PPO or a mixture of PPO and styrene copolymer constituting the matrix with a polymer component constituting the dispersed phase under proper conditions (apparatus, temperature, mixing rate, and time) including the ratio and type of components (molecular weight, molecular weight distribution, copolymerization ratio, and randomness).

Usually, the particle diameter of the dispersed phase is 0.05 to 50 microns, preferably 0.1 to 10 microns. Particles having a diameter greater than 50 microns are less effective in improving impact resistance.

The inorganic filler that can be used for the composition of this invention should meet the following requirements.

It should have an ability to penetrate the polymer component constituting the dispersed phase which is substantially crystalline. Therefore, a preferred inorganic filler has greater affinity for the functional derivative constituting the dispersed phase than for PPO or a mixture of PPO and styrene polymer constituting the matrix. If an inorganic filler as such does not have this property, it is possible to modify it accordingly by treating or coating it with another component.

In other words, the inorganic filler, as such or in the treated or coated form, should have greater affinity for at least one component of the substantially crystalline dispersed phase than for PPO or a blend of PPO and styrene polymer which constitutes the matrix.

According to this invention, it is important that the inorganic filler be present within the polymer composition constituting the dispersed phase, if the resulting composition is to exhibit high impact resistance and rigidity.

In the production of the composition of this invention, the inorganic filler is usually selected from one having a particle diameter smaller than that of the dispersed phase when it contains no filler. However, an inorganic filler having a particle diameter greater than that of the dispersed phase can be used if the particles of the inorganic filler are covered in the mixing process with the polymer constituting the dispersed phase, with the result that the inorganic filler is surrounded by the dispersed phase.

Usually, inorganic fillers having an average particle diameter smaller than 2 microns, preferably 1.5 microns, more preferably 1 micron, are preferred to obtain a high impact resistant composition.

The average particle diameter should preferably be 0.05 to 1.0 micron, more preferably 0.15 to 0.5 micron. The average particle diameter as used herein means the average maximum particle diameter of the primary particles as measured with an electron microscope. The inorganic filler may be in any shape, i.e., spherical or cubic granules, needles, plates, and fibers. Granular fillers are preferable.

Such inorganic fillers include elements such as metals belonging to Groups I to VIII of the periodic table (e.g., Fe, Na, K, Cu, Mg, Ca, Zn, Ba, Al, Ti) and silicon, and their oxides, hydroxides, carbonates, sulfates, silicates, and sulfites; clay minerals containing these compounds; and others. Examples of them are iron oxide, zinc oxide, titanium oxide, alumina, silica, aluminum hydroxide, magnesium hydroxide, calcium hydroxide, magnesium carbonate, calcium carbonate (heavy, light, colloidal), barium sulfate, calcium sulfate, sodium sulfate, calcium sulfite, calcium silicate, clay, wollastonite, glass beads, glass powder, silica, quartz powder, "Shirasu", diatomaceous earth, white carbon, iron powder, and aluminum powder. They may be used in combination.

Preferable among them are precipitated calcium carbonate and silica having an average particle diameter of 0.05 to 1.0 micron.

These inorganic fillers may be used without treatment, but may be coated by a surface treatment such as with higher fatty acids and derivatives (esters or salts) thereof (e.g., stearic acid, oleic acid, palmitic acid, calcium stearate, magnesium stearate, aluminum stearate, stearamide, ethyl stearate, methyl stearate, calcium oleate, oleamide, ethyl oleate, calcium palmitate, palmitamide, and ethyl palmitate); silane coupling agents (e.g., vinyltrimethoxysilane, vinyltriethoxysilane, vinyltriacetoxysilane, γ-chloropropyltrimethoxysilane, γ-aminopropyltrimethoxysilane, and γ-methacryloxypropyltrimethoxysilane); titanium coupling agents (e.g., isopropyltriisostearoyl titanate, isopropyltrilaurylmyristyl titanate, isopropylisostearoyldimethacryl titanate, and isopropyltridiisooctylphosphate titanate).

Another preferred means for surface treatment of the inorganic filler is the so-called mechano-chemical method by which a surface modifier is chemically bonded to the surface of the inorganic filler. For example, an inorganic filler is pulverized in the presence of an unsaturated organic acid or ester thereof (e.g., acrylic acid, methacrylic acid, methyl acrylate, methyl methacrylate, or ethyl acrylate) or a polymer thereof, so that the polymer is attached to the surface of the inorganic filler. The surface treatment for this method should preferably have affinity for at least one of the polymer components constituting the dispersed phase.

The compositions of this invention may be blended, as required, with the following components in addition to the above-mentioned PPO, styrene polymer, and polymer composition constituting the dispersed phase which is substantially crystalline: thermoplastic resins (e.g., polyamides, polyethylene terephthalate, polyvinyl chloride, thermoplastic polyesters, polyacrylonitrile, polymethyl methacrylate, and polyvinyl alcohol); stabilizers such as anti-oxidants, UV absorbers, weathering agents, heat stabilizers, corrosion inhibitors, and copper deactivators; flame retardants, colorants, anti-static agents, slip agents, neutralizers, foaming agents, dispersants, and defoamers.

The composition of this invention is composed of the above-mentioned components. The blending ratio of these components is as follows: PPO or a blend of PPO and styrene polymer constituting the matrix comprises 30 to 97 wt%, preferably 40 to 95 wt%, more preferably 50 to 90 wt%, based on the total weight of the composition. The styrene polymer should be less than 80 wt% based on the total weight of the composition. Therefore, the matrix of the composition of this invention should preferably contain 17 to 97 wt% of PPO and 80 to 0 wt% of styrene polymer based on the total weight of the composition. In the preferred embodiments, the matrix of the composition of this invention should contain 22 to 90 wt%, more preferably 30 to 80 wt%, of PPO and 73 to 5 wt%, more preferably 60 to 10 wt%, of styrene polymer based on the total weight of the composition.

The composition of this invention contains 0.5 to 50 wt%, preferably 1.0 to 45 wt%, more preferably 2.0 to 40 wt%, of the polymer (excluding the inorganic filler) constituting the dispersed phase, based on the total weight of the composition.

In the case where the polymer constituting the dispersed phase is a mixture of a functional derivative of a hydrogenated styrene-conjugated diene copolymer and a crystalline hydrogenated styrene-conjugated diene copolymer, the functional derivative should comprise 1 to 100 wt%, preferably 5 to 95 wt%, more preferably 10 to 90 wt%, and the crystalline hydrogenated styrene-conjugated diene copolymer should comprise 0 to 99 wt%, preferably 5 to 95 wt%, more preferably 10 to 90 wt%, of the mixture, based on the total weight of the two components.

In this case, the polymer constituting the dispersed phase should have an overall crystallinity greater than 5 wt%, preferably 10 wt%, as measured by the DSC method.

When the dispersed phase comprises a crystalline olefin polymer, a functional derivative thereof, and a hydrogenated styrene-conjugated diene copolymer, the crystalline olefin polymer should comprise 0 to 96 wt%, preferably 2.0 to 93 wt%, more preferably 50 to 87.5 wt%; the functional derivative should comprise 97.0 to 1.0 wt%, preferably 95.0 to 2.0 wt%, more preferably 40 to 2.5 wt%; and the hydrogenated styrene-conjugated diene copolymer should comprise 3.0 to 80 wt%, preferably 3.0 to 60 wt%, more preferably 10.0 to 55 wt%, of the mixture, based on the total weight of the three components.

The total amount of the crystalline polyolefin and the functional derivative thereof should be 97 to 20 wt%, preferably 97 to 40 wt%, most preferably 90 to 45 wt%, based on the total weight of the three components.

In this case, the mixture of the crystalline olefin polymer and the derivative thereof should have crystallinity greater than 30 wt%, preferably 40 wt%.

The composition of this invention should contain 1.0 to 60 wt%, preferably 2.0 to 55 wt%, more preferably 3 to 45 wt%, based on the total weight of the composition, of a filler.

The above-mentioned thermoplastic resin which may be added as required in addition to PPO, styrene polymer and the polymer constituting the dispersed phase should amount to less than 30 wt%, preferably less than 10 wt%, based on the total weight of the composition, in view of the miscibility with the composition. The stabilizers and other additives should be used in such amounts as are conventionally used in synthetic resins.

Process for producing the composition of this invention

The composition of this invention can be produced by mixing, followed by cooling and solidifying, the above-mentioned components using a mixer such as single-screw extruder, twin-screw extruder Banbury mixer, roll, or Brabender Plastograph; by mixing the above-mentioned components in the form of solution or suspension using a hydrocarbon such as benzene, toluene, xylene, dichlorobenzene, trichlorobenzene, chloroform, carbon tetrachloride, or derivatives thereof; by incorporating the dispersed phase component and other components during polymerization of the matrix component; or by combining the above methods. The first method is preferable.

In the case where the resin component constituting the dispersed phase contains a functional derivative, the composition of this invention should be prepared by melt-mixing PPO or a mixture of PPO and styrene constituting the matrix, a hydrogenated styrene-conjugated diene compound constituting the dispersed phase, a crystalline polyolefin and a functional derivative thereof, and an inorganic filler. According to this method, the inorganic filler moves into the resin composition constituting the dispersed phase and does not stay in the matrix.

There is no restriction as to the order of mixing the above-mentioned components; they may be mixed in any order.

It is desirable for increased impact resistance that an inorganic filler be present only in the dispersed phase. Therefore, the inorganic filler in the matrix should amount to less than 20 wt%, preferably less than 10 wt%, more preferably less than 5 wt%, based on the total weight of the filler used.

Having generally described the invention, a more complete understanding can be obtained by reference to certain specific examples, which are provided herein for purposes of illustration only and are not intended to be limiting unless otherwise specified.

In the following examples, impact strength was determined according to ASTM D-1822 by measuring tensile impact strength at 23° C. using a tensile impact tester made by Toyo Seiki Seisakusho Co., Ltd., and rigidity was determined according to ASTM D-747 by measuring Olsen flexural strength at 23° C. and at a deformation angle of 10° using an Olsen flexural tester made by Toyo Seiki Seisakusho Co., Ltd. All parts are parts by weight (p.b.w.) unless otherwise specified.

EXAMPLE 1 AND COMPARATIVE EXAMPLES 1-a AND 1-b

COMPARATIVE EXAMPLE 1-a

The following components were mixed using a super mixer and then kneaded using a Brabender Plastograph and the resulting composition was pelletized:

50 p.b.w. PPO (poly(2,6-dimethyl-1,4-phenylene oxide) powder; experimental product having an intrinsic viscosity of 0.47 dl/g in chloroform at 30° C.);

40 p.b.w. polystyrene beads (HF-77 made by Mitsubishi Monsanto Co., Ltd.);

5 p.b.w. polypropylene beads modified with maleic anhydride (experimental product based on TA8 polypropylene made by Mitsubishi Petrochemical Co., Ltd., containing 0.6 wt% of maleic anhydride and having an MFR of 30 g/10 min); and 5 p.b.w. hydrogenated styrene-butadiene-styrene copolymer crumbs (Kraton-G-1652 made by Shell Co., Ltd., almost entirely hyrogenated and almost no crystallinity at room temperature).

A part of this composition underwent pretreatment according to the method described in detail in this specification, and its morphology was observed under an electron microscope. It was found that compound particles 0.1 to 5 microns in size composed of the hydrogenated styrene-butadiene-styrene copolymer and the polypropylene modified with maleic anhydride were dispersed uniformly in the matrix which was a mixture uniformly composed of PPO and polystyrene. Furthermore, this composition melts sharply at 160° C., and this indicates that the compound particles constituting the dispersed phase are substantially crystalline.

EXAMPLE 1

The components used in Comparative Example 1-a and 10 parts by weight of precipitated calcium carbonate having an average particle diameter of 0.2 micron and cubic particle shape were mixed in the same manner as in Comparative Example 1-a. The morphology of the resulting composition was observed.

It was found that the calcium carbonate was present in the polypropylene modified with maleic anhydride which constitutes, together with the hydrogenated styrene-butadiene-styrene copolymer, the compound particles of the dispersed phase which is substantially crystalline. (See FIG. 1.)

COMPARATIVE EXAMPLE 1-b

Figure 2:
FIG. 2 is a micrograph of the composition prepared in Comparative Example 1-b. It is to be noted that calcium carbonate is uniformly dispersed in the matrix composed of PPO and polystyrene.
Figure 3:
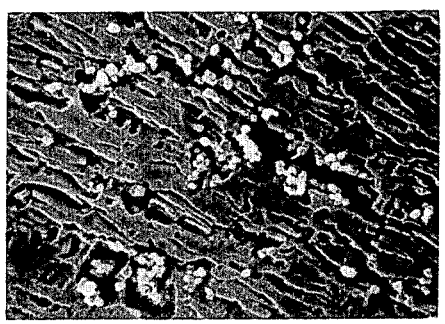
FIG. 3 is a micrograph showing the composition of Example 1 having the structure of FIG. 1 after an impact fracture. The arrows at the corner of FIG. 3 indicates the direction of external stress. It should be noted that the fracture takes place at the filler interface and that a large number of microcracks occur at the interfere between the dispersed phase and the matrix extending into the matrix in a direction perpendicular to the external stress.

For the purpose of comparison, Example 1 was repeated, but the maleic anhydride-modified polypropylene was replaced by polypropylene (TA3 made by Mitsubishi Petrochemical Co., Ltd.) in the same proportion. The morphology of the resulting composition was observed in the same way. It was found that the calcium carbonate was not present in the dispersed phase which is substantially crystalline, but was present in the matrix. (See FIG. 2.)

From the remainder of the compositions prepared in Example 1 and Comparative Examples 1-a and 1-b, test pieces were molded using a compression molding machine made by Toyo Seiki Seisakusho Co., Ltd. The impact strength and flexural rigidity of these specimens were measured. The results are tabulated in Table 1.

It is to be noted from Table 1 that the composition in Example 1, i.e. the composition having special morphology of this invention, has an extremely high impact strength as compared with the composition in Comparative Example 1-a containing no calcium carbonate.

Likewise the composition of Example 1 has an extremely high impact strength as compared with the composition of Comparative Example 1-b which contains calcium carbonate but does not have the special morphology of the composition of this invention.

TABLE 1

| | Example 1 | Comparative Example 1-a | Comparative Example 1-b |
|---|---|---|---|
| Components (wt %) | | | |
| Poly(2,6-dimethyl-1,4-phenylene oxide) | 45.0 | 50.0 | 45.0 |
| Polystyrene | 36.0 | 40.0 | 36.0 |
| Polypropylene modified with maleic anhydride | 4.5 | 5.0 | — |
| Polypropylene | — | — | 4.5 |
| Hydrogenated styrene-butadiene-styrene copolymer | 4.5 | 5.0 | 4.5 |
| Calcium carbonate | 10.0 | — | 10.0 |
| Properties | | | |
| Impact strength (kg-cm/cm$^2$) | 90.5 | 51.5 | 42.1 |
| Flexural ridigity (kg/cm$^2$) | 20,000 | 19,000 | 21,000 |

EXAMPLE 2 AND COMPARATIVE EXAMPLES 2-a AND 2-b

EXAMPLE 2

The same composition as in as prepared Example 1. The morphology of the resulting composition was observed as in Example 1, except that the maleic anhydride-modified polypropylene was replaced by maleic anhydride-modified high-density polyethylene (experimental product based on polyethylene PY-40 made by Mitsubishi Petrochemical Co., Ltd., containing 1.5 wt% of maleic anhydride and having an MFR of 1.0 g/10 min) and the precipitated calcium carbonate having an average particle diameter of 0.2 micron was substituted with precipitated calcium carbonate having an average particle diameter of 0.1 micron and cubical particle shape.

It was found that the calcium carbonate was present in the maleic anhydride-modified high-density polyethylene which constitutes, together with the hydrogenated styrene-butadiene-styrene copolymer, the compound particles of the substantially crystalline phase.

COMPARATIVE EXAMPLE 2-a

The same composition as in Example 2 was prepared and the morphology of the resulting composition was observed as in Example 2, except that the maleic anhydride-modified high-density polyethylene was replaced by unmodified high-density polyethylene (PY-40 made by Mitsubishi Petrochemical Co., Ltd., having an MFR of 1.0 g/10 min).

It was found that the calcium carbonate was not present in the compound particles of the hydrogenated styrene-butadiene-styrene copolymer and the high-density polyethylene which constitute the substantially crystalline dispersed phase, but was present in the matrix.

COMPARATIVE EXAMPLE 2-b

The same composition as in Example 2 was prepared and the morphology of the resulting composition was observed as in Example 2, except that the calcium carbonate was not used.

It was found that the substantially crystalline compound particles composed of the maleic anhydride-modified high-density polyethylene and hydrogenated styrenebutadiene styrene copolymer were dispersed in the matrix which is a uniform mixture of PPO and polystyrene. This morphology is quite similar to that of Example 2 if the presence of calcium carbonate is ignored.

Using the remainder of the compositions prepared in Example 2 and Comparative Examples 2-a and 2-b, test pieces were prepared as in Example 1, and the impact strength and flexural rigidity of the test pieces were measured as in Example 1. The results are shown in Table 2.

It is to be noted from Table 2 that the composition of Example 2 having the special morphology of the composition of this invention has an extremely high impact resistance.

TABLE 2

|  | Example 2 | Comparative Example 2-a | Comparative Example 2-b |
| --- | --- | --- | --- |
| Components (wt %) |  |  |  |
| Poly(2,6-dimethyl-1,4-phenylene oxide) | 45.0 | 45.0 | 50.0 |
| Polystyrene | 36.0 | 36.0 | 40.0 |
| High-density polyethylene modified with maleic anhydride | 4.5 | — | 5.0 |
| High-density polyethylene | — | 4.5 | — |
| Hydrogenated | 4.5 | 4.5 | 5.0 |

TABLE 2-continued

|  | Example 2 | Comparative Example 2-a | Comparative Example 2-b |
| --- | --- | --- | --- |
| styrene-butadiene-styrene copolymer |  |  |  |
| Calcium carbonate | 10.0 | 10.0 | — |
| Properties |  |  |  |
| Impact strength (kg-cm/cm$^2$) | 103.0 | 41.5 | 53.4 |
| Flexural ridigity (kg/cm$^2$) | 19,000 | 20,000 | 17,000 |

EXAMPLE 3 AND COMPARATIVE EXAMPLE 3

EXAMPLE 3

The same composition as in Example 1 was prepared except that the maleic anhydride-modified polypropylene was replaced by high-density polyethylene modified with 1.5 wt% of vinyltrimethoxysilane (experimental product having an MFR of 12 g/10 min) and the precipitated calcium carbonate was substituted with kaolin clay having an average diameter of 1 micron.

It was found that the kaolin clay is present in the vinyltrimethoxysilane-modified high-density polyethylene which constitutes, together with the hydrogenated styrene-butadiene-styrene copolymer, the compound particles of the substantially crystalline dispersed phase of 0.5 to 10 microns in size.

COMPARATIVE EXAMPLE 3

The same composition as in Example 3 was prepared and the morphology of the resulting composition was observed as in Example 3, except that the vinyltrimethoxysilane-modified high-density polyethylene was replaced by the same unmodified high-density polyethylene as used in Comparative Example 2-a.

It was found that the clay was present only in the matrix.

Using the remainder of the compositions prepared in Example 3 and Comparative Example 3, impact strength was measured. The results are shown in Table 3.

TABLE 3

|  | Example 3 | Comparative Example 3 |
| --- | --- | --- |
| Components (wt %) |  |  |
| Poly(2,6-dimethyl-1,4-phenylene oxide) | 45.0 | 45.0 |
| Polystyrene | 36.0 | 36.0 |
| Vinyltrimethoxysilane-modified high-density polyethylene | 4.5 | — |
| High-density polyethylene | — | 4.5 |
| Hydrogenated styrene-butadiene-styrene copolymer | 4.5 | 4.5 |
| Kaolin clay | 10.0 | 10.0 |
| Properties |  |  |
| Impact strength (kg-cm/cm$^2$) | 76.5 | 38.2 |

EXAMPLE 4 AND COMPARATIVE EXAMPLE 4

EXAMPLE 4

The same composition as in Example 2 was prepared except that the hydrogenated styrene-butadiene-styrene copolymer was replaced by an experimental product which was a crystalline hydrogenated styrene-butadiene-styrene block copolymer (hydrogenation greater than 98%, prepared by dissolving Kraton D-110, a product of Shell, in p-xylene and then adding p-toluenesulfonylhydrazide with heating to 130° C.).

It was found that the inorganic filler was present in the maleic anhydride-modified high-density polyethylene which constitutes, together with the crystalline hydrogenated styrene-butadiene-styrene block copolymer, the compound particles of the substantially crystalline dispersed phase.

COMPARATIVE EXAMPLE 4

The same composition as in Example 4 was prepared and the morphology of the resulting composition was observed as in Example 4, except that the maleic anhydride-modified high-density polyethylene was substituted with the same high-density polyethylene as used in Comparative Example 2-a.

It was found that the inorganic filler was present only in the matrix.

Using the compositions prepared in Example 4 and Comparative Example 4, impact strength and flexural strength were measured. The results are shown in Table 4.

TABLE 4

| | Example 4 | Comparative Example 4 |
|---|---|---|
| Components (wt %) | | |
| Poly(2,6-dimethyl-1,4-phenylene oxide) | 45.0 | 45.0 |
| Polystyrene | 36.0 | 36.0 |
| Maleic anhydride-modified high-density polyethylene | 4.5 | — |
| High-density polyethylene | — | 4.5 |
| Hydrogenated styrene-butadiene-styrene block copolymer | 4.5 | 4.5 |
| Calcium carbonate | 10.0 | 10.0 |
| Properties | | |
| Impact strength (kg-cm/cm$^2$) | 96.2 | 39.6 |
| Flexural strength (kg/cm$^2$) | 19,000 | 20,000 |

EXAMPLE 5

The same composition as in Example 4 was prepared except that the maleic anhydride-modified high-density polyethylene was replaced by the crystalline hydrogenated styrene-butadiene-styrene copolymer modified with maleic anhydride (an experimental product containing 0.8 wt% of maleic anhydride).

It was found that the inorganic filler was present in the substantially crystalline dispersed phase composed of the hydrogenated styrene-butadiene-styrene block copolymer and the maleic anhydride-modified product thereof.

EXAMPLES 6-a AND 6-b AND COMPARATIVE EXAMPLE 5

EXAMPLE 6-a

The same composition as in Example 1 was prepared except that the poly(2,6-dimethyl-1,4-phenylene oxide) was replaced by one having an intrinsic viscosity of 0.49 dl/g in chloroform at 30° C. It was confirmed that this composition has the same morphology as that of the composition in Example 1.

EXAMPLE 6-b

The same composition as in Example 6-a was prepared except that the maleic anhydride-modified polypropylene was replaced by the same maleic anhydride-modified high-density polyethylene as used in Example 2. It was confirmed that this composition has the same morphology as that of the composition in Example 2.

COMPARATIVE EXAMPLE 5

The same composition as in Example 6-a was prepared except that the maleic anhydride-modified polypropylene was substituted with maleic anhydride-modified ethylene-propylene copolymer rubber (an experimental product based on ethylene-propylene copolymer rubber, EP 02 P, a product of Nippon EP Rubber Co., Ltd., containing 1.5 wt% of maleic anhydride) and the hydrogenated styrene-butadiene-styrene block copolymer was substituted with styrene-butadiene rubber (1502, made by Japan Synthetic Rubber Co., Ltd.).

It was found that the inorganic filler was present in the maleic anhydride-modified ethylene-propylene copolymer rubber which constitutes, together with the styrene-butadiene rubber, the substantially elastomeric dispersed phase.

The compositions prepared in Examples 6-a and 6-a and Comparative Example 5 were subjected to measurement of glass transition temperature ($Tg^m$), which is a criterion for heat distortion temperature. The measurement was accomplished by using a differential scanning calorimeter (made by DuPont) in a nitrogen atmosphere using 15 mg of sample at a cooling rate of 10° C/min. The results are shown in Table 5.

TABLE 5

| | Example 6-a | Example 6-a | Comparative Example 5 |
|---|---|---|---|
| Components (wt %) | | | |
| Poly(2,6-dimethyl-1,4-phenylene oxide) | 45.0 | 45.0 | 45.0 |
| Polystyrene | 36.0 | 36.0 | 36.0 |
| Polypropylene modified with maleic anhydride | 4.5 | — | — |
| High-density polyethylene modified with maleic anhydride | — | 4.5 | — |
| Ethylene-propylene copolymer rubber modified with maleic anhydride | — | — | 4.5 |
| Hydrogenated styrene-butadiene-styrene copolymer | 4.5 | 4.5 | — |
| Styrene-butadiene rubber | — | — | 4.5 |
| Calcium carbonate | 10.0 | 10.0 | 10.0 |
| Properties | | | |
| $Tg^m$(°C.) | 161 | 157 | 146 |

EXAMPLE 7 AND COMPARATIVE EXAMPLE 6

EXAMPLE 7

The same composition as in Example 4 was prepared except that the poly(2,6-dimethyl-1,4-phenylene oxide) was replaced by one having an intrinsic viscosity of 0.44 dl/g in chloroform at 30° C., and 2.25 by weight of maleic anhydride-modified high-density polyethylene and 2.25 parts by weight of the same unmodified high-density polyethylene as used in Comparative Example 4 were used. It was confirmed that this composition has the unique morphology that the inorganic filler is present in the dispersed phase which is substantially crystalline.

COMPARATIVE EXAMPLE 6

The same composition as in Example 7 was prepared except that the maleic anhydride-modified high-density polyethylene was replaced by unmodified high-density polyethylene. It was confirmed that the inorganic filler is present only in the matrix.

The resulting compositions were subjected to measurement of impact strength. The results are shown in Table 6.

It is to be noted from Table 6 that the composition of Example 7, i.e. the composition having the unique morphology of this invention, has a much higher impact strength than the composition of Comparative Example 6.

TABLE 6

| | Example 7 | Comparative Example 6 |
|---|---|---|
| Components (wt %) | | |
| Poly(2,6-dimethyl-1,4-phenylene oxide) | 45.0 | 45.0 |
| Polystyrene | 36.0 | 36.0 |
| Maleic anhydride-modified high-density polyethylene | 2.25 | — |
| High-density polyethylene | 2.25 | 4.5 |
| Hydrogenated styrene-butadiene-styrene block copolymer | 4.5 | 4.5 |
| Calcium carbonate | 10.0 | 10.0 |
| Properties | | |
| Impact strength (kg-cm/cm²) | 69.5 | 35.2 |

What is claimed as new and sought to be protected by Letters Patent of the United States is:

1. An impact-resistant poly(phenylene oxide) composition comprising:
   (a) a matrix comprising poly(phenylene oxide) or a mixture of poly(phenylene oxide) and a styrene-based polymer, which is a polymer having at least 25 mol % of the polymer units derived from a compound having the formula:

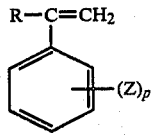

wherein R is hydrogen, a lower alkyl group, or a halogen, and Z is hydrogen, a lower alkyl group, chlorine, or vinyl and p is an integer from 1 to 5, and
   (b) dispersed in said matrix, a dispersed phase comprising a synthetic resin and a particulate inorganic filler, said synthetic resin dispersed phase substantially completely surrounding said each filler particle or aggregate thereof and being selected from the group consisting of
   (i) a crystalline olefin polymer phase comprising a functional derivative of a crystalline olefin polymer containing functional groups having an affinity for both said inorganic filler and a blend of said functional derivative of a crystalline olefin polymer with an underivatized crystalline olefin polymer, and,
   interposed between said crystalline olefin polymer phase and said matrix, a crystalline or elastomeric hydrogenated styrene-conjugated diene polymer, and
   (ii) a crystalline hydrogenated styrene-conjugated diene polymer phase comprising a functional derivative of a hydrogenated styrene-conjugated diene polymer containing functional groups having an affinity for both said inorganic filler and a blend of said functional derivative of a hydrogenated styrene-conjugated diene polymer with an underivatized crystalline hydrogenated styrene-conjugated diene polymer.

2. The composition of claim 1, wherein said poly(phenylene oxide) comprises 17 to 97 wt%, said styrene-based polymer comprises 0 to 80 wt%, said resin forming the dispersed phase comprises 0.5 to 50 wt%, and said inorganic filler comprises 1 to 60 wt% based on the total weight of the poly(phenylene oxide) composition.

3. The composition of claim 1, wherein said poly(phenylene oxide) comprises 22 to 90 wt%, said styrene-based polymer comprises 5 to 73 wt%, said resin forming the dispersed phase comprises 1.0 to 45 wt%, and said inorganic filler comprises 2.0 to 55 wt% based on the total weight of said poly(phenylene oxide) composition.

4. The composition of claim 1, wherein said poly(phenylene oxide) comprises 30 to 80 wt%, said styrene-based polymer comprises 10 to 60 wt%, said resin forming the dispersed phase comprises 2.0 to 40 wt%, and said inorganic filler comprises 3.0 to 45 wt% based on the total weight of the poly(phenylene oxide) composition.

5. The composition of claim 1, wherein said resin forming the dispersed phase comprises 20 to 97 wt% of said crystalline olefin polymer phase and 80 to 3 wt% of said hydrogenated styrene-conjugated diene copolymer interposed between said crystalline olefin polymer phase and said matrix.

6. The composition of claim 1, wherein said crystalline olefin polymer phase is a blend comprising 2 to 95 wt% of said functional derivative of a crystalline olefin polymer and 2 to 93 wt% of said underivatized crystalline olefin polymer based on the total quantity of said crystalline olefin polymer phase, said blend having a degree of crystallinity greater than 30 wt%, and 3 to 80 wt% of a hydrogenated styrene-conjugated diene copolymer surrounding said mixture.

7. The composition of claim 1, wherein said crystalline hydrogenated styrene-conjugated diene polymer phase comprises 5 to 95 wt% of a functional derivative of hydrogenated styrene-conjugated diene copolymer and 95 to 5 wt% of an underivatized crystalline hydrogenated styrene-conjugated diene copolymer based on the total quantity of said crystalline hydrogenated styrene-conjugated diene polymer phase, and has a degree of crystallinity greater than 5 wt%.

8. The composition of claim 6, wherein said functional derivative of a crystalline olefin polymer is a crystalline copolymer of an olefin and an unsaturated carboxylic acid or anhydride thereof and contains 0.25 to 25 wt% of —COOH.

9. The composition of claim 6, wherein said functional derivative of a crystalline olefin polymer is a crystalline copolymer of an olefin and an unsaturated organosilane compound and contains 0.05 to 5 wt% of Si.

10. The composition of claim 7, wherein said functional derivative of a hydrogenated styrene-conjugated diene copolymer is a hydrogenated styrene-conjugated diene copolymer in which an unsaturated carboxylic acid or anhydride thereof is copolymerized, said copolymer containing 0.25 to 25 wt% of —COOH.

11. The composition of claim 7, wherein said functional derivative of a hydrogenated styrene-conjugated diene copolymer is a hydrogenated styrene-conjugated diene copolymer in which an unsaturated organosilane compound is copolymerized, said copolymer containing 0.05 to 5 wt% of Si.

12. The composition of claim 1, wherein the inorganic filler has an average particle diameter smaller than 2 microns.

* * * * *